United States Patent [19]

Evans et al.

[11] Patent Number: 5,573,072

[45] Date of Patent: Nov. 12, 1996

[54] OPERATING POSITION ADJUSTMENT LEVERS FOR CULTIVATOR TOOLS

[75] Inventors: James R. Evans, Iowa Falls; James D. Tuttle, Sheffield, both of Iowa

[73] Assignee: Sukup Manufacturing Company, Sheffield, Iowa

[21] Appl. No.: 405,965

[22] Filed: Mar. 17, 1995

[51] Int. Cl.⁶ .................................................. A01B 15/00
[52] U.S. Cl. .......................... 172/744; 172/78; 172/397; 172/773
[58] Field of Search .......................... 172/78, 397, 398, 172/429, 673, 744, 773, 378

[56] References Cited

U.S. PATENT DOCUMENTS

| | | | |
|---|---|---|---|
| 460,021 | 9/1891 | Lindgren et al. | 172/744 X |
| 1,066,284 | 7/1913 | Kennemer | 172/744 X |
| 1,266,380 | 5/1918 | Andress, Jr. | 172/744 X |
| 1,443,835 | 1/1923 | Buikema | 172/744 X |
| 1,469,751 | 10/1923 | Chase et al. | 172/398 |
| 1,690,252 | 11/1928 | Schumacher et al. | 172/78 X |
| 1,888,128 | 11/1932 | Hester | 172/429 X |
| 2,184,422 | 12/1939 | Graham | 172/397 X |
| 4,232,422 | 11/1980 | Fellman | 172/378 X |
| 4,819,737 | 4/1989 | Frase | 172/744 X |
| 5,361,848 | 11/1994 | Fleischer et al. | 172/744 X |

OTHER PUBLICATIONS

"High Residue Cultivators" Brochure by Krause 4700 Series High Residue Row-Crop Cultivators-Form No. KR15M792 Jul. 1992.

*Primary Examiner*—Terry Lee Melius
*Assistant Examiner*—Christopher J. Novosad
*Attorney, Agent, or Firm*—Zarley, McKee, Thomte, Voorhees, & Sease

[57] ABSTRACT

An apparatus for adjusting the operating position of a cultivator tool includes a tool bar with a frame secured thereto, a tool arm pivotally mounting the cultivator tool on the frame, a bracket having a plurality of holes therein mounted on the frame, and a tiltable lever arm mechanism pivotally mounted on the frame. The latter includes a lever having a first end portion constituting a handle, a second end portion, and a detent pin adapted to engage the holes in the bracket. A spring assembly yieldingly urges or tilts the bracket and lever together so the pin normally engages one of the holes. A handle extension can be installed to apply additional leverage, if needed. When the second end portion is connected to the frame by torsional spring, the downpressure exerted on an implement mounted on the frame can be varied. In another embodiment, a linkage bar pivotally connects the second end portion of the lever with the tool arm and allows the apparatus to raise and lower the tool.

12 Claims, 4 Drawing Sheets

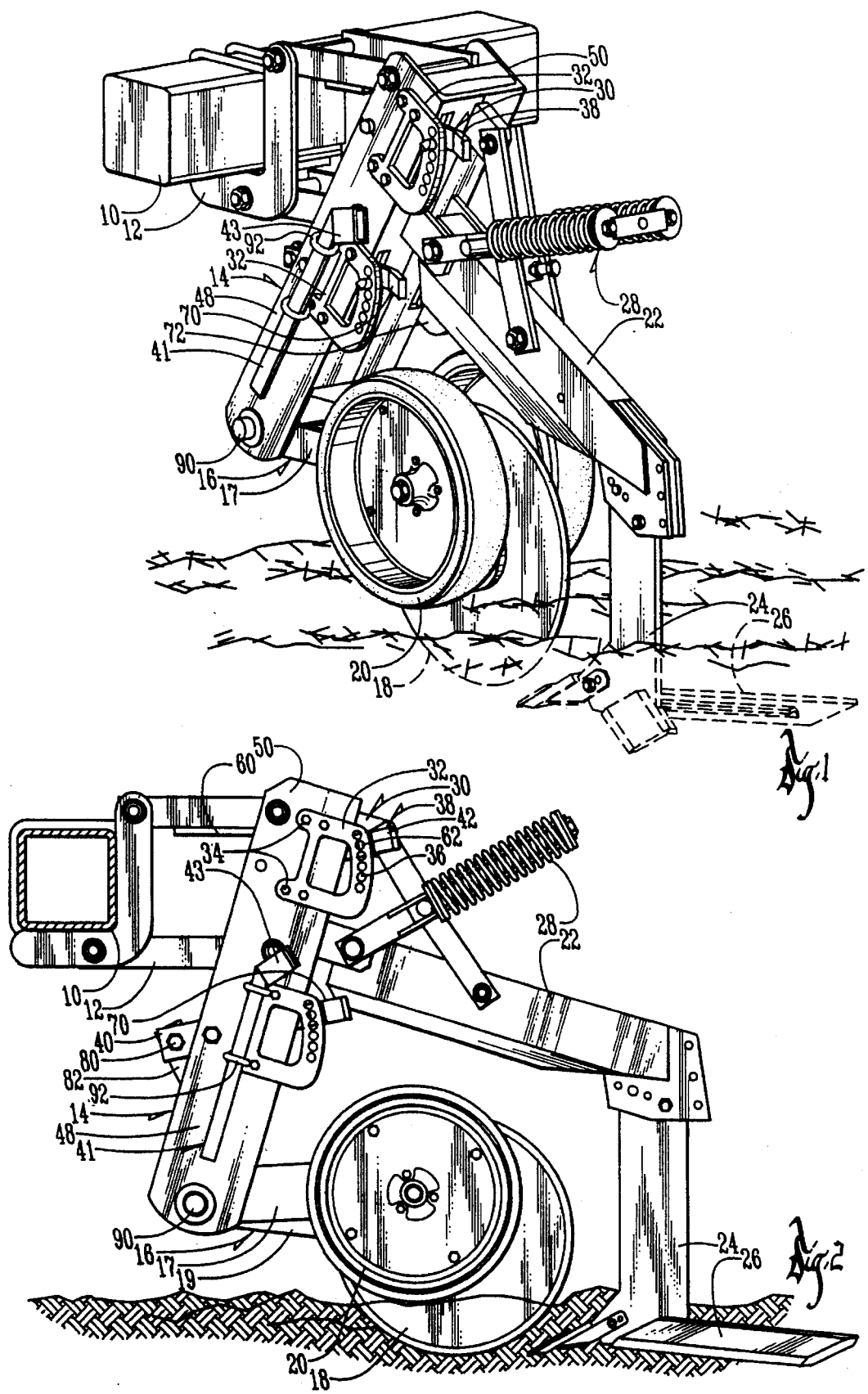

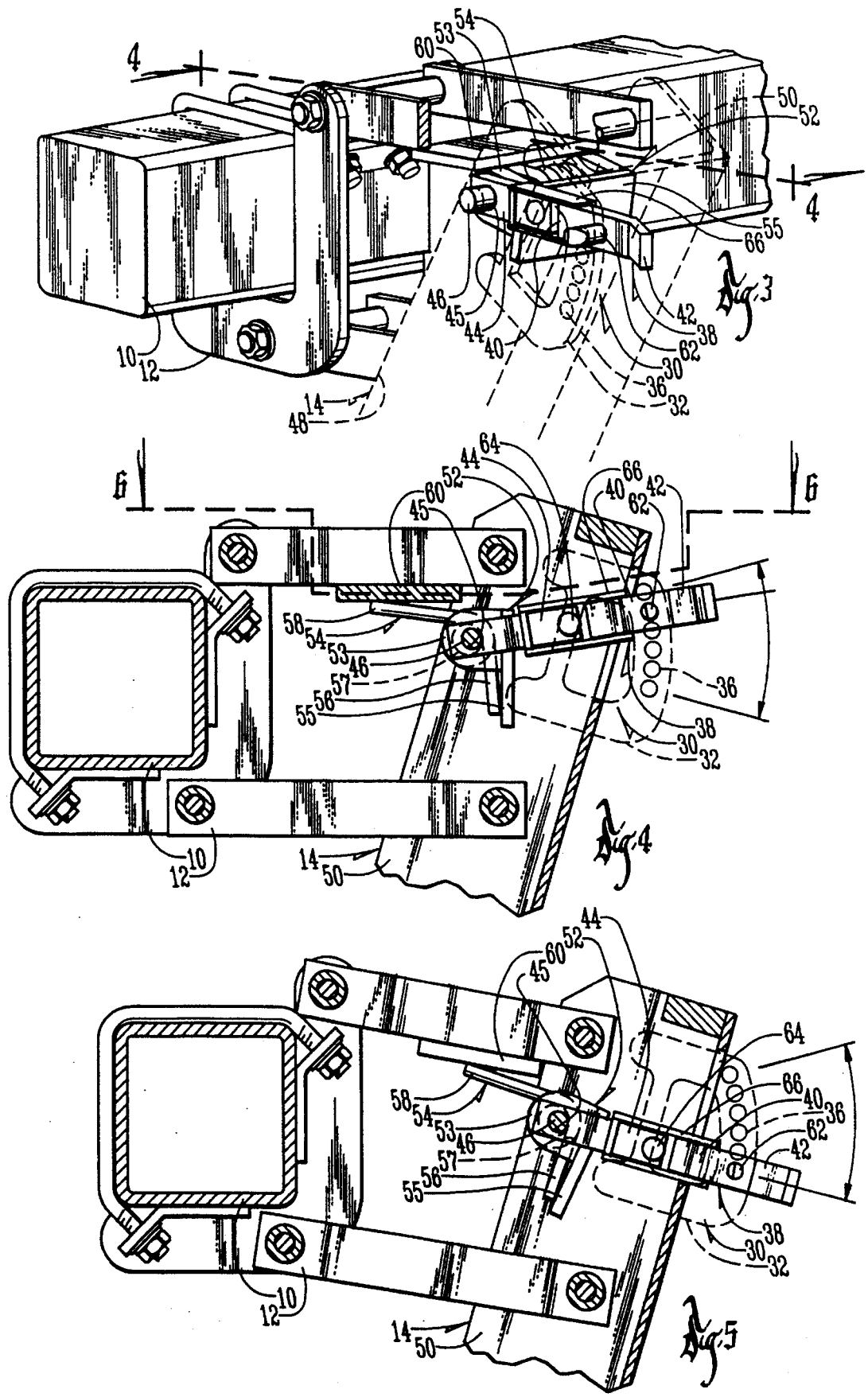

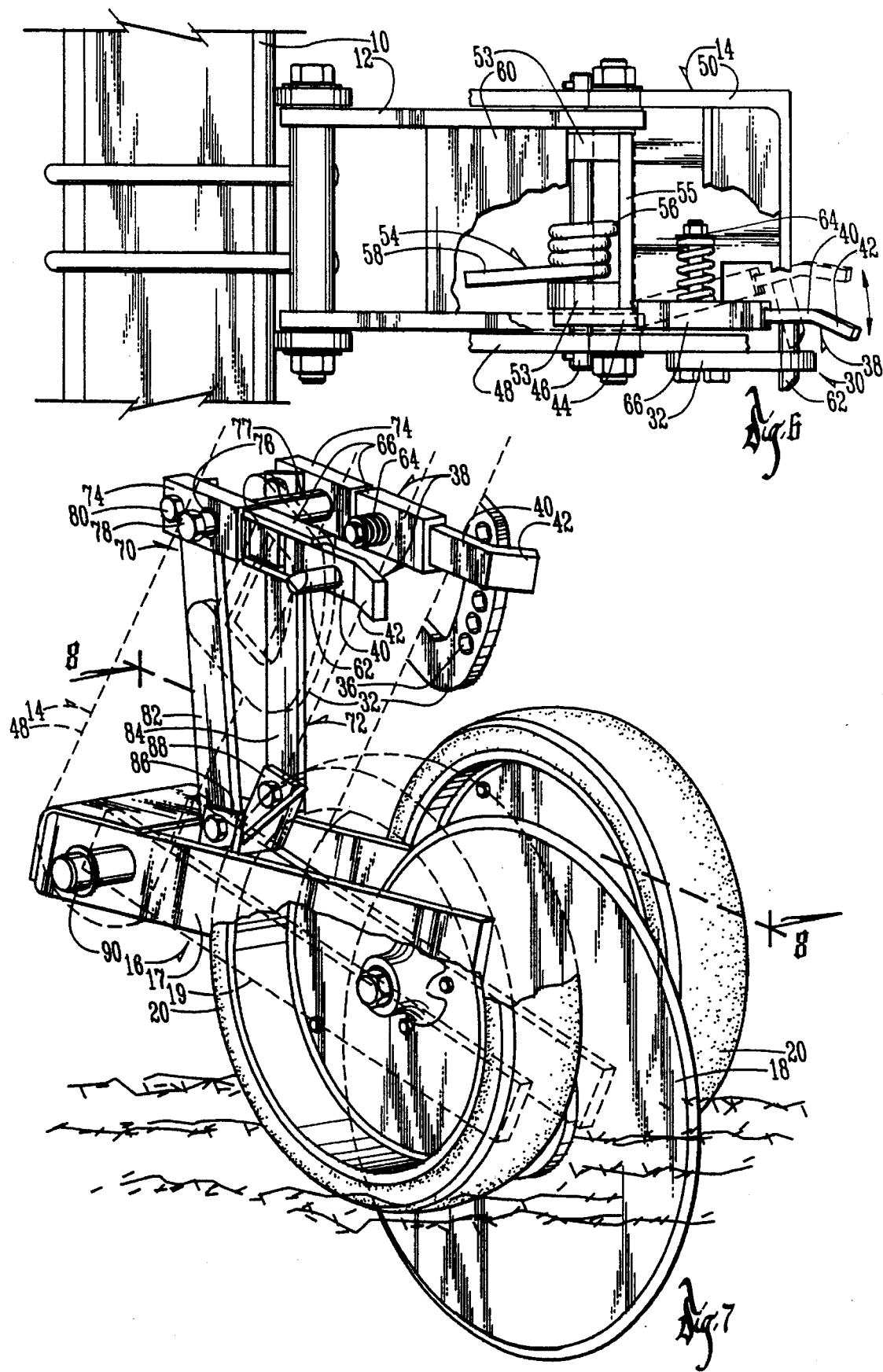

OPERATING POSITION ADJUSTMENT LEVERS FOR CULTIVATOR TOOLS

BACKGROUND OF THE INVENTION

The present invention relates to the field of agricultural cultivating equipment, more particularly to a mechanism for adjusting the operating position, including height and downpressure, of various tools mounted on the cultivator.

Conventional cultivators typically draw a variety of tools behind a tool bar. To achieve the desired results in the field, it is advantageous to be able to adjust the operating position of the various tools on the tool bar. Various known devices have been tried to provide the desired operating adjustment for the tools. However, conventional mechanisms have proven to be difficult, complicated, and time consuming to adjust.

Therefore, a primary objective of the present invention is the provision of a tool operating position adjustment mechanism that is an improvement over the prior art.

A further objective of the present invention is the provision of a tool operating position adjusting mechanism that is quick and easy to use.

A further object of the present invention is the provision of a standardized adjustment mechanism that may be utilized for downpressure adjustments as well as for height adjustments.

A further objective of the present invention is to provide the desired adjustment without the use of wrenches.

These and other objectives will become apparent to one skilled in the art based on the description which follows and the accompanying drawings.

SUMMARY OF THE INVENTION

The present invention provides a mechanism for adjusting the operating position of a cultivator tool on a cultivator. On one embodiment, the height of the tool is adjusted. In another embodiment, a similar mechanism can be utilized to adjust the downpressure on an implement.

In both embodiments, the mechanism for adjusting the operating position of a cultivator tool includes a tool bar mounted to the cultivator. A frame is secured to the tool bar and a tool arm pivotally mounts the cultivator tool on the frame. A bracket having a plurality of spaced first positioning members, such as holes therein, is mounted on the frame. A lever arm mechanism is mounted adjacent the bracket on the frame and includes a lever having first and second end portions. The first end portion constitutes a handle for moving the lever arm mechanism with respect to the frame and bracket. The lever also includes a second positioning member, such as a detent pin which extends from the first end portion for selectively engaging the holes in the bracket. A spring assembly is operatively attached to one of the brackets and the lever so as to yieldingly urge the lever into engagement with the bracket. This spring assembly maintains the detent pin in one of the holes in the absence of outside forces.

In the height adjusting embodiment, a linkage bar connects the tool arm with the second end portion of the lever such that the height of the tool is adjusted when the lever is pivoted. In the downpressure adjusting embodiment, a torsional spring is mounted at the end of the lever opposite the handle. The torsional spring has ends interposed between the frame and the tool bar linkage. Thus, the torsional spring operatively replaces the linkage bar so as to provide a secondary adjustment of the downpressure exerted on the sweep assembly mounted on the upper tool arm.

Various types of tools can be raised or lowered by the mechanism of the present invention, including but not limited to a coulter blade, one or more depth gauge wheels, or a sweep assembly. The mechanism of the present invention can be located on whichever side of the frame is desired.

BRIEF DESCRIPTION OF THE DRAWINGS

FIG. 1 is a perspective view of the tool bar of a cultivator having various tools thereon whose operating position, including height and/or downpressure is adjustable with the mechanisms of the present invention.

FIG. 2 is a side elevation view of the adjusting mechanisms of the present invention on a cultivator whose tools are engaging the ground.

FIG. 3 is an enlarged perspective view of the downpressure adjusting mechanism of the present invention with the main frame and bracket removed for clarity.

FIG. 4 is a sectional view taken along line 4—4 in FIG. 3, showing additional downpressure of a small magnitude being applied to the tool by the downpressure adjusting mechanism of the present invention.

FIG. 5 is a sectional view similar to FIG. 4, except that a larger magnitude of additional downpressure is being applied.

FIG. 6 is a top plan view taken along line 6—6 in FIG. 4, showing the downpressure adjusting mechanism of the present invention.

FIG. 7 is an enlarged perspective view of the tool height adjusting mechanisms of the present invention. The main frame and bracket have been removed for clarity.

DETAILED DESCRIPTION OF THE PREFERRED EMBODIMENT

Figure 8:
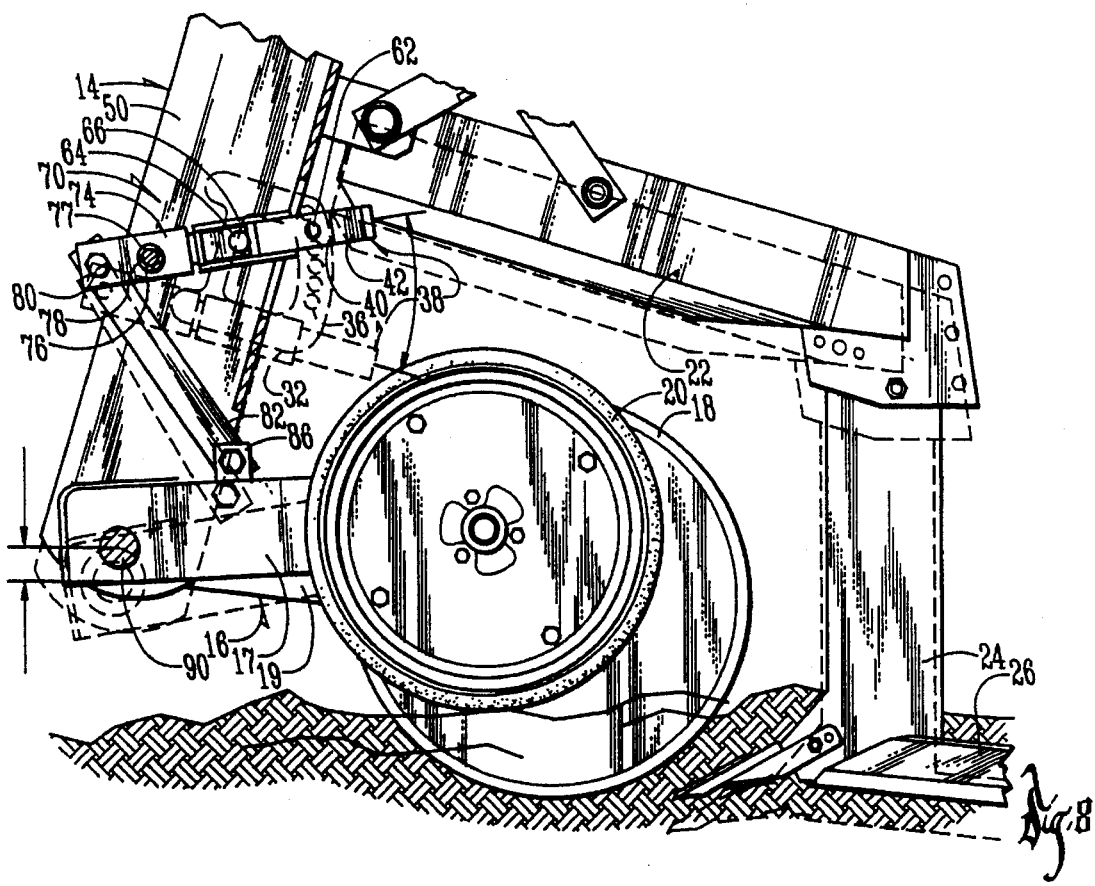
FIG. 8 is a side view taken along line 8—8 in FIG. 7, showing the depth gauge wheel height adjustment mechanism of the present invention.

In the drawings and the description which follows, like parts are referred to with like reference numerals. As used in this application, the term "cultivator tool" broadly refers to a ground-engaging tool mounted to a cultivator. A cultivator tool includes, but is not limited to, a coulter blade, a sweep, and one or more depth gauge wheels.

As shown in FIG. 1, modern cultivators are generally equipped with a tool bar 10 extending transversely. Parallel linkage means 12 connect a main gang or main frame 14 to the tool bar 10.

In the preferred embodiment of the present invention, a lower tool arm 16 has one end pivotally connected to the lower end of the frame 14 (see FIG. 7). The other end of the lower tool arm 16 comprises a depth gauge wheel mounting bracket 17 and a coulter arm 19 for rotatably mounting the depth gauge wheels 20 and the coulter blade 18, respectively. Preferably, the coulter arm 19 extends between the sides of the bracket 17 and is pivotally connected thereto. Thus, one depth gauge wheel 20 is disposed on either side of the coulter blade 18. The depth gauge wheels 20 and coulter blade 18 are conventional and their construction is well known in the art.

According to the present invention, the cultivator is also equipped with an upper tool arm 22, which has one end pivotally mounted to the main frame 14 and another end connected to a conventional shank 24 and a sweep or ridger 26. The position of the sweep 26 is maintained by means of a spring loaded trip mechanism 28. Mechanism 28 is well known and is not the subject of the present invention. Rather, the present invention involves the use of a downpressure mechanism 30 to increase or decrease the downpressure put on the sweep 26. Of course, the height of the sweep 26 may also be affected as a result of the change in downpressure.

The novel downpressure adjustment mechanism 30 of this invention includes a bracket 32 that is mounted by fasteners 34 to the frame 14, as best seen in FIGS. 1 and 2. Preferably, the bracket 32 is fastened to one side of the frame 14 above the upper tool arm 22. A portion of the bracket 32 overhangs the frame 14 and includes first positioning member, such as arcuately spaced holes 36, thereon. Preferably, the centers of the holes 36 are equally spaced approximately one inch apart. As best seen in FIG. 3, a lever arm mechanism 38 comprises a lever 40 having a first end portion constituting a handle 42 and a second end portion 44. The second end portion 44 has a hole 45 therein for receiving a pivot pin 46, which pivotally mounts the lever 40 to the sides 48 and 50 of the frame 14. The handle 42 is bent at an obtuse angle away from the frame 14.

As best seen in FIGS. 4 and 6, a pivot bracket 52 has a pair of opposing ears 53 which are mounted on the pivot pin 46. The pivot bracket 52 also includes a flange portion 55 which extends downwardly from and between the ears 53. A torsional spring 54 has a coiled central portion 57 which surrounds the pivot pin 46. The coiled central portion 57 terminates in a first spring end 56 and a second spring end 58. The first spring end 56 engages the flange portion 55 of the pivot bracket 52. The second spring end 58 engages a strike plate 60 attached to the parallel linkage 12. As a result, the torsional force of the spring 54 is translated into a vertical downpressure force through the parallel linkage 12 and the frame 14 to the upper tool arm 22.

A second positioning member, such as a detent pin 62, extends from the face of lever 40 that is proximate to the bracket 32. The detent pin 62 is positioned so as to be aligned with the holes 36 in the bracket 32. As best seen in FIG. 6, a spring assembly 64 is operatively attached to the lever 40. The spring assembly 64 urges the lever 40 and the detent pin 62 thereon toward the bracket 32 and thereby into engagement with the holes 36. Once one of the holes 36 is engaged by the detent pin 62, the spring assembly 64 also helps ensure that the engagement will be maintained in the absence of outside forces. As shown in FIG. 3, a sleeve member 66 having a U-shaped channel is attached, preferably welded, to one portion of the lever 40. The U-shaped channel allows the lever 40 to be constructed in two separate halves, which overlap and are joined by a carriage bolt extending through both halves and the spring assembly 64 so as to provide the horizontal pivotability needed to disengage the detent pin 62 from the holes 36. Yet, the sides of the U-shaped channel prevent the lever 40 from pivoting vertically while the detent pin 62 is still engaged in the one of the holes 36. The sleeve 66 also spaces the lever 40 away from the frame so it can be easily grasped and moved. Thus, the structure described above securely retains the detent pin 62 in one of the holes 36 of the bracket 32 until the user moves the lever 40 horizontally to disengage the detent pin 62 from the hole 36. Thereafter, the lever 40 can be pivoted vertically into alignment with a new hole 36.

Many of the components described above for adjustment of downpressure can be used to adjust the height of other cultivator tools attached to the tool bar 10. As best seen in FIG. 7, a pair of independent height adjustment mechanisms 70 and 72 operatively interconnect the frame 14 with the lower tool arm 16 or portions thereof. The height adjustment mechanisms 70 and 72 both include a lever 40. See FIGS. 5 and 7. The lever 40 also includes a central portion 74 with a hole 76 therein. A pivot pin 78 extends through the hole 76 and the sides 48 and 50 of the frame 14 so as to pivotally attach the lever 40 thereto. The pivot pin 78 also extends through a lever spacer 77, which positions the lever 40 against the sides 48 and 50 of the frame 14. Furthermore, the spacer 77 maintains an appropriate distance between the lever 40 so they do not interfere with each other.

A conventional fastener 80 extends through the hole 45 to attach each lever 40 to the respective linkage bar 82 or 84. Linkage bars 82 and 84 are pivotally connected to the lower tool arm 16 by L-brackets 86 and 88 respectively. FIG. 7 illustrates the pivotal connection 90 between the frame 14 and the lower tool arm 16. Preferably, the lower tool arm 16 comprises a depth gauge wheel mounting bracket 17 and a coulter arm 19 pivotally connected together at the same connection 90. The bracket 86 is attached to the bracket 17 for raising and lowering the depth gauge wheels 20, whereas bracket 88 is attached to the coulter arm 19 for raising and lowering the coulter blade 18.

Figure 9:
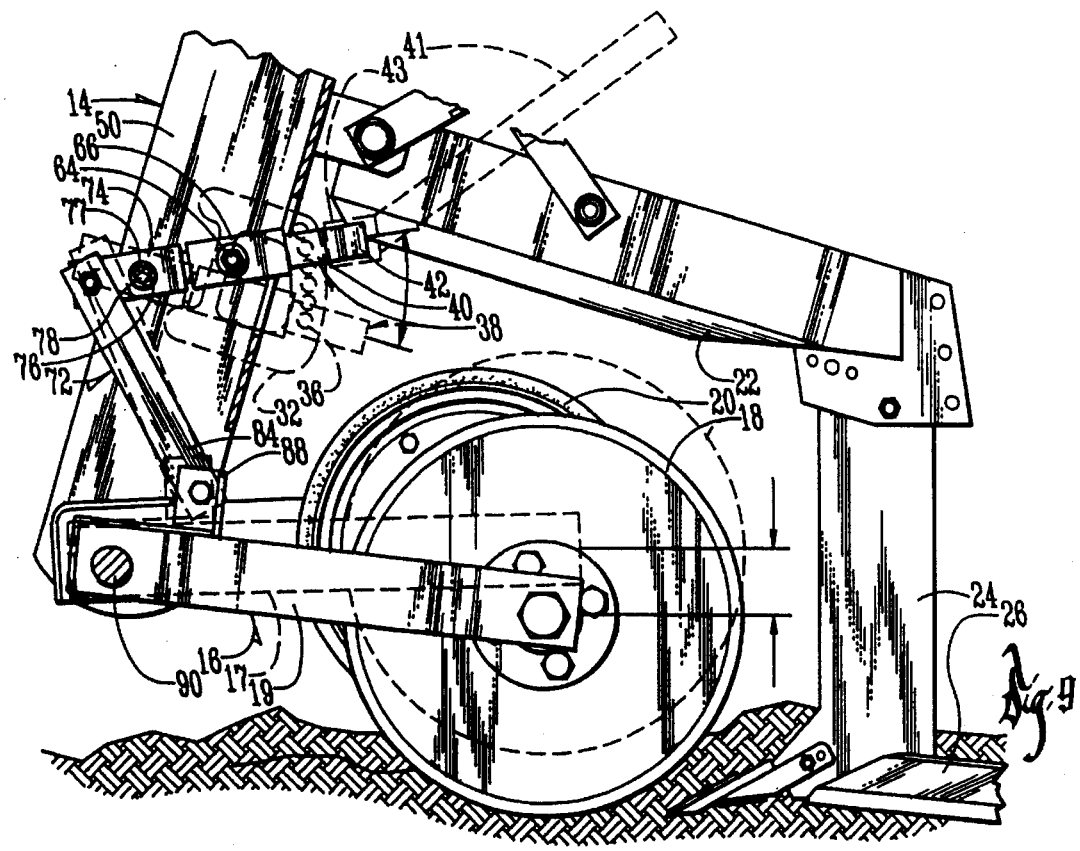
FIG. 9 is side view similar to FIG. 8, except showing the coulter blade height adjustment mechanism of the present invention.

As shown in FIG. 9, an elongated handle extension 41 can be connected to the handle 42 to provide additional leverage to raise and lower the relatively heavy cultivator tools. Preferably, the handle extension 41 has a socket end 43 that slips over the bent portion of the handle 42.

When not in use, the handle extension 41 can be stored by slipping it through a pair of spaced eyebolts 92 on the side 48 of 50 of the frame 14.

OPERATION

The operation of the height adjustment embodiment of the present invention can be understood from FIGS. 6–9. To change the height of the depth gauge wheels 20, the user takes the handle extension 41 and slips it on the handle 42 on the lever 40 that is mounted to the left hand side of the frame 14, i.e. mechanism 70. The user pushes the handle 42 toward the center of the frame 14, in other words away from the bracket 32. See FIG. 6. When sufficient force is applied, the biasing of the spring assembly 64 is overcome and the detent pin 62 clears the holes 36.

Next, the handle 42 can be raised or lowered to a new position with the detent pin 62 aligned with another one of the holes 36. Moving handle 42 back to the left so the detent pin 62 engages the hole 36 sets the new height of the depth gauge wheels. For instance, FIG. 8 shows the gauge depth wheels 20 raised or lowered with respect to the frame 14.

It will be understood that raising or lowering the depth gauge wheel bracket 17 causes the other tools 18 and 26 mounted on the frame 14 to move relative to the ground. Note in FIG. 8 that the upper tool arm 22 with the sweep 26 mounted thereon moves closer to the ground when the wheels 20 are raised.

The raising or lowering of the coulter blade 18 is accomplished in a similar manner by moving the handle 42 that is mounted to the right hand side of the frame 14, i.e. mechanism 72. The handle 42 is pushed toward the center of the frame 14 so as to overcome the biasing force of the spring assembly 64 and disengage the detent pin 62 from the hole 36 into which it extends. Once the detent pin 62 clears the hole 36 in the bracket 32, the handle 42 can be pivoted or moved vertically so that the detent pin 62 is aligned with another of the holes 36. Then the handle 42 is moved back to the right so as to allow the detent pin 62 to engage the new hole 36 and set a new height for the coulter blade 18. When the lever 40 is pivoted in such a manner, the linkage bar 84 connected thereto raises or lowers the coulter arm portion 19 of the lower tool arm 16, as shown in FIG. 9.

The operation of the downpressure embodiment of the present invention or the downpressure adjusting mode is best understood in view of FIGS. 4 and 5. Again, the user pushes the handle 42 toward the center of the frame 14 until the detent pin 62 is disengaged from the hole 36 that it previously occupied. Thereafter, the lever 40 can be moved to alignment with a new hole 36 and the detent pin 62 engaged therewith.

Depending on the relative direction in which the lever 40 is moved, the torsional spring 54 becomes coiled more or less tightly. This results in more or less downpressure being applied to the frame and thereby to the upper tool arm 22 on which the sweep/ridger 26 is mounted. FIG. 4 illustrates the pivoting of the lever arm mechanism 38 upwardly so that the torsional spring 54 is less tightly coiled and exerts less downpressure on the sweep 26. On the other hand, FIG. 5 illustrates a situation where the lever arm assembly 38 has been pivoted lower so that the torsional spring 54 is more tightly coiled and therefore exerts more downpressure on the sweep 26.

It will be understood that the types of first and second positioning members can be switched without detracting from the invention. For example, the pins can be located on the bracket 32 and a hole for receiving them can be provided on the lever 40.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. An apparatus for adjusting the operating position of a cultivator tool on a cultivator, the apparatus comprising:

a tool bar mounted on the cultivator;

a frame secured to the tool bar;

a tool arm pivotally mounting the cultivator tool on the frame;

a bracket mounted on the frame and having a plurality of spaced first positioning members thereon;

a lever arm mechanism pivotally mounted on the frame adjacent the bracket, and including a lever having a first end portion constituting a handle, a second end portion opposite the handle, and a second positioning member adapted for engagement with the first positioning members;

a spring means operatively attached to one of the bracket and the lever for yieldingly urging the bracket and the lever toward each other and thereby the second positioning member into engagement with one of the spaced first positioning members aligned therewith and maintaining said engagement in the absence of outside forces; and means connecting the tool arm with the second end portion of the lever such that the operating positioning of the tool is adjusted when the lever is pushed away from the bracket pivoted, and set in a new position, the connecting means comprising a torsional spring operatively interposed between the lever arm mechanism, the tool bar, and the frame, whereby the torsional force of the spring and thereby the down pressure on the tool arm is varied depending on the position of the handle.

2. An apparatus for adjusting the operating position of a cultivator tool on a cultivator, the apparatus comprising:

a tool bar mounted on the cultivator;

a frame secured to the tool bar;

a tool arm pivotally mounting the cultivator tool on the frame;

a bracket mounted on the frame and having a plurality of spaced first positioning members thereon;

a lever arm mechanism pivotally mounted on the frame adjacent the bracket, and including a lever having a first end portion constituting a handle, a second end portion opposite the handle, and a second positioning member adapted for engagement with the first positioning members;

a spring means operatively attached to one of the bracket and the lever for yieldingly urging the bracket and the lever toward each other and thereby the second positioning member into engagement with one of the spaced first positioning members aligned therewith and maintaining said engagement in the absence of outside forces;

means connecting the tool arm with the second end portion of the lever such that the operating positioning of the tool is adjusted when the lever is pushed away from the bracket, pivoted, and set in a new position;

the frame having opposite sides and a first lever arm mechanism, a first bracket, and a first linkage bar being mounted on one side of the frame and a second lever arm mechanism, a second bracket, and a second linkage bar being mounted on the opposite side of the frame thereby allowing a first tool to be raised and lowered from one side of the frame and a second tool to be raised and lowered from the opposite side of the frame.

3. The apparatus of claim 2 wherein the first lever arm mechanism and the second lever arm mechanism are separately connected to the tool arm and thereby operate independently of each other.

4. An apparatus for adjusting the operating position of a cultivator tool on a cultivator, the apparatus comprising:

a tool bar mounted on the cultivator;

a frame secured to the tool bar;

a tool arm pivotally mounting the cultivator tool on the frame;

a bracket mounted on the frame and having a plurality of spaced first positioning members thereon;

a lever arm mechanism pivotally mounted on the frame adjacent the bracket, and including a lever having a first end portion constituting a handle, a second end portion opposite the handle, and a second positioning member adapted for engagement with the first positioning members;

a spring means operatively attached to one of the bracket and the lever for yieldingly urging the bracket and the lever toward each other and thereby the second positioning member into engagement with one of the spaced first positioning members aligned therewith and maintaining said engagement in the absence of outside forces;

means connecting the tool arm with the second end portion of the lever such that the operating positioning of the tool is adjusted when the lever is pushed away from the bracket, pivoted, and set in a new position; and the handle including an elongated handle extension having one end detachably connected to the handle for providing additional leverage and a pair of vertically spaced eyebolts being mounted on the frame for receiving and holding the extension on the frame.

5. An apparatus for adjusting the operating position of a ground engaging element on a cultivator, the apparatus comprising:

a tool bar mounted on the cultivator;

a frame secured to the tool bar;

a tool arm pivotally mounting the ground engaging element on the frame;

a bracket mounted on the frame and having a plurality of spaced first positioning members thereon;

a tiltable lever arm mechanism pivotally mounted on the frame adjacent to the bracket, and including an elongated lever having a first end portion constituting a handle, a second end portion opposite the handle, and a second positioning member on the lever, the second positioning member extending transversely to a longitudinal axis of the lever and being adapted for engagement with one of the first positioning members when aligned therewith;

a spring means operatively attached to one of the bracket and the lever for yieldingly urging the bracket and the lever to normally tilt toward each other and thereby urging the second positioning member into engagement with one of the spaced first positioning members aligned therewith and maintaining said engagement in the absence of outside forces, the spring means extending transversely to the longitudinal axis of the lever;

means connecting the tool arm with the second end portion of the lever such that the operating positioning of the ground engaging element is adjusted when the first end portion of the lever is pushed against the spring means so that the lever tilts away from the bracket in a first plane, thence pivoted in a second plane, and is thence set in a new position wherein the second positioning member can be aligned and engaged with a different first positioning member when the first end portion of the lever is released;

the lever having a finite thickness and including a central portion between the first and second end portions;

the tiltable lever mechanism including an elongated sleeve member having a longitudinal channel therein for receiving the central portion of the lever, the channel in the sleeve being generally U-shaped and having an open side, the channel in the sleeve having a depth greater than the thickness of the central portion of the lever and at least one rib spanning across the open side of the channel so as to retain the sleeve on the lever.

6. The apparatus of claim 5 wherein the first positioning members on the bracket comprise a plurality of arcuately spaced holes therein and the second positioning member on the lever comprises a mating detent pin.

7. The apparatus of claim 5 wherein the connecting means comprises an elongated linkage bar having one end pivotally connected to the second end portion of the lever and another end pivotally connected to the tool arm.

8. The apparatus of claim 5 wherein the handle includes an elongated handle extension having one end detachably connected to the handle for providing additional leverage.

9. The apparatus of claim 5 wherein the ground engaging element is a coulter blade.

10. The apparatus of claim 5 wherein the ground engaging element is a depth gauge wheel.

11. The apparatus of claim 5 wherein the ground engaging element is a sweep.

12. An apparatus for adjusting the operating position of a ground engaging element on a cultivator, the apparatus comprising:

a tool bar mounted on the cultivator;

a frame secured to the tool bar;

a tool arm pivotally mounting the ground engaging element on the frame;

a bracket mounted on the frame and having a plurality of spaced first positioning members thereon;

a tiltable lever arm mechanism pivotally mounted on the frame adjacent to the bracket, and including an elongated lever having a first end portion constituting a handle, a second end portion opposite the handle, and a second positioning member on the lever, the second positioning member extending transversely to a longitudinal axis of the lever and being adapted for engagement with one of the first positioning members when aligned therewith;

a spring means operatively attached to one of the bracket and the lever for yieldingly urging the bracket and the lever to normally tilt toward each other and thereby urging the second positioning member into engagement with one of the spaced first positioning members aligned therewith and maintaining said engagement in the absence of outside forces, the spring means extending transversely to the longitudinal axis of the lever;

means connecting the tool arm with the second end portion of the lever such that the operating positioning of the ground engaging element is adjusted when the first end portion of the lever is pushed against the spring means so that the lever tilts away from the bracket in a first plane, thence pivoted in a second plane, and is thence set in a new position wherein the second positioning member can be aligned and engaged with a different first positioning member when the first end portion of the lever is released;

the lever having a finite thickness and including a central portion between the first and second end portions;

the tiltable lever mechanism including an elongated sleeve member having a longitudinal channel therein for receiving the central portion of the lever, the channel in the sleeve being generally U-shaped and having an open side, the channel in the sleeve having rib means spanning across the open side of the channel so as to retain the sleeve on the lever.

* * * * *